(12) United States Patent
Henninger et al.

(10) Patent No.: US 10,689,545 B2
(45) Date of Patent: Jun. 23, 2020

(54) DISPERSION, METHOD FOR COATING OBJECTS WITH THIS DISPERSION, AND USE OF THE DISPERSION

(71) Applicant: FRAUNHOFER-GESELLSCHAFT ZUR FÖRDERUNG DER ANGEWANDTEN FORSCHUNG E.V., München (DE)

(72) Inventors: Stefan Henninger, Endingen (DE); Harry Kummer, Freiburg (DE); Felix Jeremias, Freiburg (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 18 days.

(21) Appl. No.: 15/855,885

(22) Filed: Dec. 27, 2017

(65) Prior Publication Data

US 2018/0118974 A1 May 3, 2018

Related U.S. Application Data

(62) Division of application No. 14/413,190, filed as application No. PCT/EP2013/065123 on Jul. 17, 2013, now abandoned.

(30) Foreign Application Priority Data

Jul. 19, 2012 (DE) .......................... 10 2012 014 335

(51) Int. Cl.
| | | |
|---|---|---|
| C09D 183/04 | (2006.01) | |
| C08K 3/04 | (2006.01) | |
| C08K 3/34 | (2006.01) | |
| C08K 3/22 | (2006.01) | |
| C08L 83/04 | (2006.01) | |
| C08K 5/098 | (2006.01) | |
| C08G 77/00 | (2006.01) | |
| F28F 21/00 | (2006.01) | |
| F28F 21/02 | (2006.01) | |

(52) U.S. Cl.
CPC ............. *C09D 183/04* (2013.01); *C08K 3/04* (2013.01); *C08K 3/22* (2013.01); *C08K 3/34* (2013.01); *C08K 5/098* (2013.01); *C08L 83/04* (2013.01); *C08G 77/80* (2013.01); *F28F 21/00* (2013.01); *F28F 21/02* (2013.01); *F28F 2245/02* (2013.01)

(58) Field of Classification Search
CPC ..... F28F 2245/02; C09D 183/04; C08K 3/04; C08K 3/34; C08K 3/22
USPC ....................................................... 428/447
See application file for complete search history.

(56) References Cited

U.S. PATENT DOCUMENTS

| | | | |
|---|---|---|---|
| 3,031,366 A | 4/1962 | Bueche et al. | |
| 5,599,445 A | 2/1997 | Betz et al. | |
| 6,508,860 B1 | 1/2003 | Kulkarni et al. | |
| 7,820,592 B2 | 10/2010 | Cattaneo et al. | |
| 2003/0089228 A1 | 5/2003 | Kulprathipanja et al. | |
| 2003/0175533 A1* | 9/2003 | McGarry | B32B 5/26 428/447 |
| 2005/0045031 A1* | 3/2005 | Rajagopalan | B01D 53/02 95/133 |
| 2005/0272601 A1 | 12/2005 | Cattaneo et al. | |
| 2006/0189775 A1* | 8/2006 | Takahashi | C08F 210/16 526/352 |
| 2008/0093059 A1* | 4/2008 | Nishida | B01D 53/261 165/133 |
| 2008/0128941 A1* | 6/2008 | Lopez | D01F 1/10 264/172.11 |
| 2008/0308262 A1 | 12/2008 | Sauer et al. | |
| 2009/0075060 A1* | 3/2009 | Miller | A61L 9/014 428/323 |
| 2009/0092776 A1 | 4/2009 | Betz et al. | |
| 2009/0155464 A1 | 6/2009 | Liu et al. | |
| 2010/0132559 A1 | 3/2010 | Ishida et al. | |
| 2010/0140638 A1* | 6/2010 | Kotani | B29C 45/0001 257/98 |
| 2011/0183835 A1 | 7/2011 | Sauer et al. | |
| 2011/0232493 A1* | 9/2011 | Yeganeh | B01J 20/18 96/146 |
| 2011/0319673 A1* | 12/2011 | Dunne | C07C 29/76 568/916 |
| 2013/0068101 A1 | 3/2013 | Knapp et al. | |

FOREIGN PATENT DOCUMENTS

| | | |
|---|---|---|
| CN | 1751085 A | 3/2006 |
| CN | 101079489 A | 11/2007 |
| CN | 101107494 A | 1/2008 |

(Continued)

OTHER PUBLICATIONS

English language translation JP 03/244996 Nov. 1991 (Year: 1991).*
English language translation KR 1020090039179 Apr. 2009 (Year: 2009).*
Basu et al., "Solvent resistant nanofiltration (SRNF) membranes based on metal-organic frameworks," *J. Membr. Sci* 344(1): 190-198 (2009).

(Continued)

*Primary Examiner* — Margaret G Moore
(74) *Attorney, Agent, or Firm* — Leydig, Voit & Mayer, Ltd.

(57) ABSTRACT

The invention relates to a dispersion and also to a method for coating objects, in particular heat exchanger structures, in which this dispersion is applied on a carrier structure and is crosslinked and/or made into a film with formation of a layer. Likewise, the invention relates to heat exchanger structures coated in this way. The dispersions according to the invention can likewise be used for coatings in the construction of chemical plants and also in medical technology.

17 Claims, No Drawings

(56) References Cited

FOREIGN PATENT DOCUMENTS

| DE | 102005003543 A1 | | 8/2006 |
|---|---|---|---|
| DE | 102008050926 A1 | | 4/2010 |
| DE | 102011011688 A1 | | 8/2012 |
| JP | 03/244996 | * | 11/1991 |
| JP | 2001-321425 A | | 11/2001 |
| JP | 2004-148274 A | | 5/2004 |
| JP | 2009-091208 A | | 4/2009 |
| KR | 1020090039179 | * | 4/2009 |

OTHER PUBLICATIONS

Takamizawa et al., "Alcohol-Vapor Inclusion in Single-Crystal Adsorbents [$M^{II}{}_{2}(bza)_{4}(pyz)]_{n}$ (M=Rh, Cu): Structural Study and Application to Separation Membranes," *Chem. Asian J.* 2(7): 837-848 (2007).

German Patent Office, Office Action in German Patent Application No. 10 2012 014 335.4 (dated Mar. 11, 2013).

European Patent Office, International Search Report in International Application No. PCT/EP2013/065123 (dated Sep. 20, 2013).

European Patent Office, Written Opinion in International Application No. PCT/EP2013/065123 (dated Sep. 20, 2013).

European Patent Office, International Preliminary Report on Patentability in International Application No. PCT/EP2013/065123 (dated Jan. 29, 2015).

State Intellectual Property Office of the People's Republic of China, Notification of First Office Action in Chinese Patent Application No. 201380038159.6 (dated Dec. 9, 2015).

State Intellectual Property Office of the People's Republic of China, Second Office Action in Chinese Patent Application No. 201380038159.6 (dated Jul. 5, 2016).

State Intellectual Property Office of the People's Republic of China, Third Office Action in Chinese Patent Application No. 201380038159.6 (dated Mar. 22, 2017).

Korean Intellectual Property Office, Notification of Reason for Refusal in Korean Patent Application No. 10-2015-7001240 (dated Sep. 11, 2019).

* cited by examiner

DISPERSION, METHOD FOR COATING OBJECTS WITH THIS DISPERSION, AND USE OF THE DISPERSION

This patent application is the divisional of co-pending U.S. patent application Ser. No. 14/413,190, filed Jan. 6, 2015, now abandoned which is the U.S. national phase of International Application No. PCT/EP2013/065123, filed on Jul. 17, 2013, which claims the benefit of German Patent Application No. 10 2012 014 335.4, filed Jul. 19, 2012, the disclosures of which are incorporated by reference in their entireties for all purposes.

The invention relates to a dispersion and also to a method for coating objects, in particular heat exchanger structures, in which this dispersion is applied on a carrier structure and is crosslinked and/or made into a film with formation of a layer. Likewise, the invention relates to heat exchanger structures coated in this way. The dispersions according to the invention can likewise be used for coatings in the construction of chemical plants and also in medical technology.

Exploitation of the physical process of adsorption of gases on microporous surfaces and hence the use in thermally actuated heat pumps and refrigeration machines has various advantages:

Use of waste heat or heat at a low temperature level for cooling, accompanied by energy-efficient cooling or even solar cooling;

Relieving the load of the electrical network by thermally actuated refrigeration machines, Primary-energy efficient energy and cooling, as a result of the heat pump effect, environmental heat (low temperature heat) is raised to a usable level.

Disadvantages result due to the equipment which to date is still very large and the poor power density associated therewith, in comparison with conventional mechanical systems.

Heat pumps or adsorption refrigeration plants constructed at present have low power densities, which results in a very large construction in order to achieve corresponding cooling or heating outputs. Important approaches for making the construction more compact and increasing the power density reside in constructing the sorption chamber to be smaller. For this purpose, a large surface of the heat exchanger must be ensured and good adhesion of the sorption material thereon.

Adsorption refrigeration machines and -heat pumps and also thermal stores based on the adsorption of gases on microporous solid materials are known from the state of the art, mainly water and also silica gels, zeolites and zeolite-like materials being used as operating media. Generally beds or loose adhesions are hereby used.

In addition, coating technology has been developed in recent years, which is distinguished however frequently by inadequate coupling and also by a lack of adequate thermal and mechanical stability. The possible systems of binder and active sorption material and also the carrier structure have to date been very restricted.

If the sorption material in the form of a granular bed or as a moulded article is used in the sorption heat pumps or sorption refrigeration pumps, heat- and material transport limit the output of the plant. Whilst the material transport is limited naturally by macroscopic granulates, the heat transport is restricted by the mainly present point contacts, e.g. spherical granulates on a carrier metal sheet.

If in contrast the sorption material is used in a thin layer on the heat exchanger due to a planar composite, the material transport and above all the heat transport can be significantly improved.

An adsorber element is known from DE 10 2008 050 926 A1, which consists of a carrier material on which sorbent particles with a binder material are disposed as adsorber layer. As binder, colloidal binders based on silicon oxide or aluminium oxide are used here.

Starting herefrom, it was the object of the present invention to provide a stable dispersion for coating substrates, in particular metallic and ceramic substrates, which allow more simple handling during coating.

This object is achieved by the features of the dispersion described herein, by the method for coating substrates and the coated heat exchanger structure also described herein, and the advantageous developments thereof. Uses according to the invention are also described.

According to the invention, a dispersion for coating substrates which has the following components is provided:
at least one porous sorbent selected from the group consisting of mesoporous alumino- and/or silicon compounds, metal-organic frameworks (MOFs) and/or porous coordination polymers (PCPs), zeolite-imidazolate networks (ZiFs), mesoporous molecular sieves (MCMs), activated carbons, carbon molecular sieves, hexacyanometallates and mixtures hereof,
at least one binder from the group of polyorganosiloxanes and
at least one organic solvent.

There is understood by sorbent, within the scope of the present invention, in particular an adsorbent. However, it can also be materials which exhibit absorption in addition.

According to the invention, a dispersion of a binder and a porous solid material in an organic solvent was therewith provided, which surprisingly is stable over at least 6 h, preferably 12 h, particularly preferred 24 h and in particular 48 h. With the dispersion according to the invention, for example ceramic and metallic substrates can hence be coated with a porous solid material. The preparation of binder, sorption material and organic solvent is applied on the substrate and solidified by evaporation of the organic solvent or crosslinked in addition in the case of reactive end groups.

In contrast to the aqueous dispersion, the dispersion according to the invention in an organic solvent has the following advantages:

The polysiloxane binder or the precursor thereof emerges from production already in the form of an organic solution/dispersion, the preparation of an aqueous dispersion and the complexity associated therewith are dispensed with. In addition, the solution comprises no dispersion aids and fewer further processing aids.

Numerous sorption materials, e.g. MOFs, such as copper (II)-trimesate "HKUST-1" or zinc terephthalate MOF-5, are produced by solvothermal synthesis and are produced from this in the form of a dispersion in an organic solvent. If likewise the binder is present in an organic phase, the suspension for the coating can be produced directly by blending the two components. Purification of the material can be effected significantly more easily on the coated heat exchanger, complex and expensive separation steps (centrifugation) can be avoided.

Many sorption materials react sensitively to water. When using organic suspensions, successful coatings of these materials were able to be produced. The possibility of producing coatings also from water-sensitive materials opens up numerous further application possibilities, for instance in the field of sensory technology or heterogeneous catalysis. With skilled process control, also open handling of particularly sensitive substances, even those requiring protective gas, in the form of an organic dispersion is conceivable.

By the choice of the organic solvent, the evaporation rate can be controlled very well, which enables a more efficient drying process.

Organic solvents generally have a lower surface tension, as a result of which wetting is improved relative to the undercoat and to the adsorption material and thus improved distribution of the binder on the surfaces is obtained. Liquids with low surface tensions have in addition more homogeneous surfaces after drying.

Suspensions of sorption materials in organic liquids are shown to be significantly more stable with respect to demixing and sedimentation, which substantially simplifies implementation on a large industrial scale.

By varying the molecule size in the case of different solvents, it can be controlled specifically whether the solvent penetrates into the micro- and/or micropores of the adsorption material. As a result, it can be specifically ensured for example that a dissolved binder does not penetrate into the pores at all and this can no longer adhere or cause a blockage.

As a result of the low vapour pressures of many solvents, drying at high temperatures can become superfluous. Thus the drying process no longer requires further use of energy.

Relative to aqueous dispersions, the dispersion according to the invention has the advantage in addition that, by the choice of a suitable organic solvent with a low boiling point in comparison to water, the evaporation rate and hence the drying process during the coating can be significantly accelerated.

The dispersion according to the invention thereby has the additional advantages, with respect to the coating, that mechanically and thermally highly-loadable surfaces can herewith be produced, which enable good heat- and material transport, the technical and equipment outlay during the coating being able to be kept low.

It is preferred that the at least one sorbent has nano-, meso- and/or macropores and hence is porous and has a BET surface of at least 300 m$^2$/g, in particular of 300 to 5,000 m$^2$/g. There should be understood here by nanopores, pores with a diameter of 0.1 to 2 nm. Mesopores have a diameter of 2 to 50 nm, whilst macropores have a diameter of at least 50 nm, in particular of 50 nm to 950 µm.

A further preferred embodiment provides that the mesoporous alumino- and/or silicon compounds are selected from the group consisting of silica gels, zeolites and zeolite-like materials, aluminophosphates, silica aluminophosphates and metal aluminium phosphates and also mixtures hereof.

Preferably, the at least one sorbent is water-sensitive. There are included herein, for example MOF-5 or HKUST-1. However, also water-sensitive activated carbons or mesoporous molecular sieves (MCM) exist.

The at least one sorbent is preferably present as a powder, in particular with an average crystallite size of 50 nm to 20 µm and in particular with an average particle size of 200 nm to 200 µm.

It is further preferred that the at least one binder is selected from the group consisting of aliphatic, olefinic and aromatic mono-, di- and triorganosiloxanes which can be crosslinked via a crosslinker, in particular silanes, silicates, such as soda water glass or silicic acids. Aliphatic and/or aromatic diorganosiloxanes, such as for example methylsilicone resins or phenylsilicone resins or combinations hereof, are suitable in particular for this purpose. These can be present dissolved as monomers or even be polymerised. A crosslinker can be added in order to vary the strength and the flexibility. This can be introduced as supplement, such as for example tri- or tertiary silanes (for example octyltriethoxysilane or beta-(3,4-epoxycyclohexyl)ethyltriethoxysilane) or can even be contained as active end group of the polymers.

Preferably, the at least one solvent is selected from the group consisting of hydrocarbons, in particular aliphatic and aromatic hydrocarbons, preferably benzene and alkyl-substituted benzene derivatives, such as toluene, xylenes or ethylbenzene, or from the group consisting of aliphatic or aromatic alcohols, esters, ketones such as methanol, 2-methylpropan-1-ol or 2-methoxy-1-methylethylacetate.

Furthermore, it is preferred that, in the dispersion, in addition stabilisers, emulsifiers, low-molecular functional additives for improving the processability, for example organic and inorganic rheological additives, in particular polyurethane resins or pyrogenic silicic acid, components increasing heat conductivity, in particular graphite, expanded graphite, carbon fibres, carbon tubes, glass fibres, metallic nanoparticles and also mixtures hereof, are contained.

A further preferred variant provides that the suspension, relative to the dry mass without a proportion of solvent, has the following composition:

60% to 99% by weight, in particular of 80 to 95% by weight, of the sorbent, 1 to 40% by weight, in particular of 5 to 15% by weight, of the binder, 0 to 10% by weight of additives, selected from the group of stabilisers, emulsifiers, low-molecular functional additives for improving the processability and also mixtures hereof.

The suspensions according to the invention have surprisingly good stability which enables a coating with the dispersion in a time period of at least 6 h, preferably 12 h, particularly preferred 24 h and in particular 48 h.

According to the invention, a method for coating substrates, in particular heat exchanger structures, is likewise provided, in which a) the dispersion is formed on the substrate or is applied on the substrate after production, b) film formation and/or crosslinking with formation of a layer is effected at temperatures of 0° C. to 300° C., in particular at temperatures of 50 to 250° C.

Firstly film formation can hereby take place on the surface and the material subsequently can be thoroughly dried. By introducing active end groups and/or crosslinker molecules, additionally a molecular crosslinking of the binder can be produced during the drying process.

Preferably, the film formation and/or—crosslinking can be accelerated by applying a vacuum or by heating.

It is further preferred that the dispersion is formed on the substrate by firstly the binder being applied on the substrate and subsequently the sorbent being scattered on in dry or moist form and subsequently being dried.

Handling of the materials under a water-free or even inert gas atmosphere can hereby be required.

Application of the dispersion in step b) is effected preferably by means of manual application, immersion coating, spray coating, rotational coating or various knife-coating methods.

It is further preferred that the coating is produced with a layer thickness in the range of 100 nm to 10 mm, in particular of 100 μm to 1 mm.

A further preferred embodiment provides that the substrate consists of a metal or a metal alloy, in particular aluminum and the alloys thereof, copper and the alloys thereof or stainless steel, a glass, a polymer, a ceramic or combinations of these or essentially comprises these.

According to the invention, likewise coated heat exchanger structures which are producible according to the previously described method are provided.

The dispersions according to the invention are used for the production of
- sorption layers for sorption processes with coolants, in particular in heat pumps, refrigeration machines and also for dehumidification and sorption-assisted air conditioning,
- sorption layers for sorption processes for thermal storage,
- protective layers and sterile layers in medical technology,
- sensory or catalytically active layers, in particular for gas phase solid bed reactions,
- sorption layers for gas separation and gas storage.

There should be understood here by sterile layers, sterile coatings, e.g. of operation instruments. Since the sorbent keeps the water content on the surface of such layers to a minimum because of the water absorbency, the formation of germs, the formation of which is possible only in an aqueous media, can be suppressed outstandingly because of these dry conditions.

The subject according to the invention is intended to be explained in more detail with reference to the subsequent examples without wishing to restrict said subject to the specific embodiments shown here.

EXAMPLE 1

Coating of an aluminum sheet with a xylene-containing suspension of a water-sensitive adsorption material and a polyorganosiloxane as binder The aluminum sheets (alloy AlMg3) were washed with isopropanol and dried. Subsequently, the sheets were etched for 60 s in freshly prepared 2-molar NaOH solution. Subsequently immersed in water and washed under running distilled water, dried with a paper towel and weighed.

1.9290 g adsorption material (HKUST-1, Basolite®-C300, BASF) was made up to 6.9213 g with xylene (isomer mixture, technical). Subsequently, the suspension was treated for 5 min. in the ultrasound bath. Shortly before the processing, with constant agitation, 0.9492 g of a phenylmethylsilicone resin solution (55% by weight in xylene) (Silikophen® P50/300, Evonik Industries) was added to the suspension. Between 0.8 and 1.5 ml of the dispersion was applied on the sample sheets with a Pasteur pipette.

The coated sheets were heated on a heating plate to 55° C. and hence dried. Subsequently, all the samples were heated for the duration of 5 h to 200° C.

The addition of a substrate network additive, for example 0.032 g Tego® Twin 4100, can improve the homogeneity of the layer.

EXAMPLE 2

Coating of an aluminum sheet with a solvent-containing dispersion of an adsorption material and a polyorganosiloxane as binder The aluminum sheets (alloy AlMg3) were pretreated in a mechanical-abrasive manner, washed with distilled $H_2O$ and isopropanol and dried. Subsequently, the sheets were etched for 60 s in sodium hydroxide solution (150 g NaOH/l) at 65° C. Thereafter immersed in water and washed under running distilled water, dried with a paper towel and weighed.

1.9699 g adsorption material (activated carbon, Carbo-Tech A35/1) was made up to 6.9528 g with xylene (isomer mixture, technical). Subsequently, the solid material dispersion was treated for 5 min. in the ultrasound bath. Shortly before processing, with agitation, 0.6457 g of a phenylmethylsilicone resin solution (55% by weight in xylene) (Silikophen P50/300, Evonik) was added to the dispersion. 0.8-1.5 ml of the dispersion was applied on the sample sheets with a Pasteur pipette.

The coated sheets were heated on a heating plate to 60° C. and consequently dried. Subsequently, all of the samples were heated once again at 250° C. on the heating plate for 45 min.

Variant:

Instead of xylene as solvent, also methanol can be used. For this purpose, 1.9778 g adsorption material (activated carbon, CarboTech A35/1) was made up to 6.6042 g with methanol. Subsequently, the solid material dispersion was treated for 5 min. in the ultrasound bath. Shortly before processing, with agitation, 0.6434 g of a phenylmethylsilicone resin solution (55% by weight in xylene) (Silikophen P50/300, Evonik) was added to the dispersion.

If water is taken as the basis for the dispersion and if the phenylmethylsilicone resin dissolved in xylene is replaced with an aqueous system (for example SILRES® MP50, Wacker), the dispersion agglomerates immediately after addition of the silicone resin. Processing by application is no longer possible here.

EXAMPLE 3

Coating of an aluminum sheet with a xylene-containing dispersion of a zeolite-like hydrophilic adsorption material and a polyorganosiloxane as binder The aluminum sheets (AlMg3 alloy) were pretreated in advance in a mechanical-abrasive manner and washed with distilled $H_2O$. Thereafter washed with isopropanol and dried. Subsequently, the sheets were etched for 60 s in NaOH (150 g/l) at 65°, immersed in water and washed under running distilled water, dried with a paper towel and weighed.

1.9699 g of a strongly hydrophilic adsorption material (Y-zeolite, CBV100, Zeolyst) was made up to 10.194 g with xylene (technical). Subsequently, the solid material dispersion was treated for 5 min in the ultrasound bath. Shortly before processing, 0.4288 g of a phenylmethylsilicone resin solution (55% by weight in xylene) (Silikophen® P50/300, Evonik Industries) was added to the dispersion and agitated once again with the magnetic agitator. 1.5 ml of the dispersion was applied on the sample sheets with a glass pipette.

The coated sheets were heated on a heating plate to 60° C. and dried. Subsequently, all of the samples were heated once again at 250° C. on the heating plate for 45 min.

The invention claimed is:

1. A coated heat exchanger structure which is produced according to a method wherein
   a) a dispersion is formed on a substrate or is applied on a substrate after production, and
   b) film formation and/or crosslinking with formation of a film layer is or are effected on the dispersion at temperatures of 0° C. to 300° C., wherein the dispersion comprises:
  (i) at least one porous sorbent selected from the group consisting of mesoporous alumino- and silicon compounds, metal-organic frameworks (MOFs), porous coordination polymers (PCPs), zeolite-imidazolate networks (ZiFs), mesoporous molecular sieves (MCMs), activated carbons, carbon molecular sieves, hexacyanometallates and mixtures thereof,
  (ii) at least one binder, wherein the at least one binder consists of a monomer or monomers, which is or are crosslinked via a crosslinker, wherein the monomer or monomers are selected from the group consisting of aliphatic monoorganosiloxanes, olefinic monoorganosiloxanes, aromatic monoorganosiloxanes, aliphatic diorganosiloxanes, olefinic diorganosiloxanes, aromatic diorganosiloxanes, aliphatic triorganosiloxanes, olefinic triorganosiloxanes, aromatic triorganosiloxanes, and mixtures thereof,
  and
  (iii) at least one organic solvent;
  wherein the mesoporous alumino- and silicon compounds are selected from the group consisting of zeolites, aluminophosphates, silica aluminophosphates, and metal aluminium phosphates, and wherein the coated heat exchanger structure comprises a film layer containing at least one porous sorbent dispersed within the at least one binder.

2. The coated heat exchanger structure according to claim 1, wherein the method includes accelerating the film formation and/or crosslinking by applying a vacuum or by heating.

3. The coated heat exchanger structure according to claim 1, wherein the method includes forming a dispersion on the substrate by first applying the binder on the substrate and subsequently scattering on the sorbent in dry or moist form and subsequently drying.

4. The coated heat exchanger structure according to claim 1, wherein the film formation is carried out by application of the dispersion in step b) of the method, and the application is effected by manual application, immersion coating, spray coating, rotational coating or a knife-coating method.

5. The coated heat exchanger structure according to claim 1, wherein the film layer has a layer thickness in the range of 100 nm to 10 mm.

6. The coated heat exchanger structure according to claim 1, wherein the substrate consists of a metal or a metal alloy, a glass, a polymer, a ceramic or combinations thereof.

7. The coated heat exchanger structure according to claim 6, wherein the metal or metal alloy is selected from the group consisting of aluminum, aluminum alloys, copper, copper alloys and stainless steel.

8. A sorption process wherein the coated heat exchanger structure according to claim 1 is utilized in combination with a coolant.

9. The coated heat exchanger structure according to claim 1, wherein the at least one sorbent has nano-, meso- and/or macropores, is porous, and has a BET surface of at least 300 $m^2/g$.

10. The coated heat exchanger structure according to claim 9, wherein the at least one sorbent has a BET surface of at least 300 to 5,000 $m^2/g$.

11. The coated heat exchanger structure according to claim 1, wherein the at least one sorbent is water-sensitive.

12. The coated heat exchanger structure according to claim 11, wherein the at least one sorbent is copper(II)-trimesate (HKUST-1) or zinc terephthalate (MOF-5).

13. The coated heat exchanger structure according to claim 1, wherein the at least one sorbent is present as a powder, with an average crystallite size of 50 nm to 20 μm.

14. The coated heat exchanger structure according to claim 1, wherein the at least one solvent is selected from the group consisting of hydrocarbons, aliphatic alcohols, aromatic alcohols, esters, ketones, and mixtures thereof.

15. The coated heat exchanger structure according to claim 1, wherein the dispersion additionally comprises stabilisers, emulsifiers, low-molecular functional additives for improving the processability, or components increasing the heat conductivity.

16. The coated heat exchanger structure according to claim 1, wherein the dispersion, relative to the dry mass without a proportion of solvent, has the following composition:
  60% to 99% by weight of the sorbent, 1 to 40% by weight of the binder, and
  0 to 10% by weight of additives, selected from stabilisers, emulsifiers, functional additives for improving the processability, and mixtures thereof.

17. The coated heat exchanger structure according to claim 1, wherein the dispersion is stable over a time period of from at least 2 hours to at least 48 hours.

* * * * *